(12) United States Patent
Wetzel

(10) Patent No.: US 7,648,539 B2
(45) Date of Patent: Jan. 19, 2010

(54) DIESEL FUEL COMPOSITION

(75) Inventor: Timothy Dion Wetzel, Portland, OR (US)

(73) Assignee: Tellus Renewables LLC, Arlington, WA (US)

( * ) Notice: Subject to any disclaimer, the term of this patent is extended or adjusted under 35 U.S.C. 154(b) by 344 days.

(21) Appl. No.: 11/602,621

(22) Filed: Nov. 21, 2006

(65) Prior Publication Data

US 2007/0119095 A1    May 31, 2007

Related U.S. Application Data

(60) Provisional application No. 60/739,673, filed on Nov. 25, 2005.

(51) Int. Cl.
*C10L 1/18* (2006.01)
*C10L 1/00* (2006.01)

(52) U.S. Cl. .......................... 44/308; 44/307

(58) Field of Classification Search ............... 44/308, 44/307
See application file for complete search history.

(56) References Cited

U.S. PATENT DOCUMENTS

| | | | |
|---|---|---|---|
| 6,090,169 A * | 7/2000 | Krull et al. ............... 44/395 |
| 6,277,158 B1 * | 8/2001 | McLean .................... 44/399 |
| 6,514,298 B2 * | 2/2003 | Haji et al. ................. 44/420 |
| 6,979,426 B2 * | 12/2005 | Teall et al. ............... 422/237 |
| 2004/0060229 A1 * | 4/2004 | Todd et al. ............... 44/603 |
| 2005/0166447 A1 * | 8/2005 | Corkwell et al. .......... 44/415 |
| 2006/0037237 A1 * | 2/2006 | Copeland et al. ........ 44/605 |
| 2006/0236598 A1 * | 10/2006 | Selvidge .................. 44/388 |

* cited by examiner

*Primary Examiner*—Glenn A Caldarola
*Assistant Examiner*—Pamela Weiss
(74) *Attorney, Agent, or Firm*—Wilson Sonsini Goodrich & Rosati

(57) ABSTRACT

The present invention is a hybrid diesel fuel and method of manufacture. The fuel composes a petroleum diesel fuel mixed into a biosynthetic waste or virgin oil and further containing a stabilizer. The hybrid fuel consists essentially of about 10% to 50% of Diesel Number 1, Diesel Number 2, or Farm Diesel petroleum fuels, and up to 90% filtered and polished biosynthetic oil, measured by volume. The biosynthetic oil can contain all levels of common commercial vegetable and animal fats in any ratio. The hybrid fuel also contains up to about 0.17% stabilizer, which further contains cetane boosters, cleaning agents to remove deposits from the fuel system, a lubricant, demulsifiers, and anti-gelling agents. The invention functions as biocide to inhibit bacterial growth. The invention is substantially equivalent to Diesel Number 2 in terms of power and engine speed, but is cleaner burning and considerably less costly.

18 Claims, No Drawings

DIESEL FUEL COMPOSITION

This application claims the benefit of U.S. Provisional Patent Application Ser. No. 60/739,673, filed Nov. 25, 2005. U.S. Non Provisional Filing date Nov. 21, 2006.

TECHNICAL FIELD & BACKGROUND

The present invention generally relates to the field of engine fuels. More specifically, the present invention relates to a composition of blended engine fuel made from petroleum diesel fuel in minor part combined with waste vegetable or animal oils in major part, and further modified with an admixture of stabilizing chemical agents. The resultant hybrid fuel is particularly suitable for applications powered by diesel engines, but is additionally useful for other fueling and heating applications. The invention is further suitable as an internal mechanical lubricant. The present invention also pertains to the obligatory method for producing this hybrid fuel.

BACKGROUND OF THE INVENTION

Because of dwindling supplies of mineral hydrocarbon fuels, urgent social and economic needs exist for alternative fuels derived from renewable sources. "Natural", biosynthetic oils, typically those obtained from plant seeds or from other vegetable components or vegetable waste materials, represent a practical solution to the fuel supply problem. These "natural" fuels, except for processing and shipping expenditures, do not impact the availability of petrochemical fossil fuels.

Furthermore, with concerns of global warming, vegetable oil fuels are themselves "carbon-neutral" and upon combustion do not substantially increase the concentration of a green house gas or carbon dioxide, in the atmosphere. Vegetable oils are ultimately produced photosynthetically, utilizing atmospheric carbon dioxide as a carbon source. Hence, combustion of these oils essentially recycles carbon into the environment and does not increase the overall carbon burden. For practical purposes, it is critical, of course, that vegetable oil fuels are renewable, in contrast to petroleum fuels, which are in limited geological supply.

Waste vegetable oil (WVO) is an energy-rich resource obtained in large quantities as a byproduct from the food preparation industry, which employs vegetable oils as frying agents. One such common WVO is known, for instance, as "yellow grease", YG, because of the color it develops upon use as a fry medium. Other spent frying oils or fats, such as beef tallow, derived from beef fat, and lard, derived from pork fat, are also potential fuels because of their high energy content. WVO, YG, lard, and spent tallow require recycling or further utilization to prevent build-up and environmental contamination. An increasingly attractive, economical usage for these waste products is as a fuel feedstock.

Biodiesel, already in active commerce, is one example of an alternative fuel utilizing vegetable oils, including WVO as a feedstock. Biodiesel is a renewable fuel produced by the transesterification of vegetable oils with a basic catalyst to produce combustible methyl and ethyl fatty acid esters. These esters are then separated from the reaction mixture to provide clean, energy-rich diesel fuel materials.

Typically, biodiesel fuels are blended with petroleum-based diesel fuels, such as Diesel Number 1 or Diesel Number 2, to produce hybrid fuels with acceptable performance and storage qualities (generic quality standards for diesel fuels are set by the American Society for Testing and Materials, ASTM; for diesel fuels that standard is ASTM 975). For example B20 is a hybrid biodiesel diesel fuel produced by blending 20% biodiesel with 80% petrochemical diesel by volume. Analogously, B50 biodiesel contains 50% biodiesel by volume.

B20 is a highly desirable diesel fuel, recently becoming more available commercially, with good cetane rating and other favorable characteristics. B20 contains less sulfur than Diesel Number 2, because the biofuel component is essentially sulfur free, and therefore B20 and other biodiesel hybrid mixtures burn more cleanly then Diesel Number 2 itself. B20 meets ASTM standard 6751, established specifically for biodiesel fuel quality and performance.

There are, nonetheless, drawbacks to biodiesel fuels. It is well recognized that the alcoholic components used in the manufacture of biodiesel, particularly methanol, are toxic and require special handling. These alcoholic components are volatile and highly flammable, and can be explosive. The reaction catalyst base, frequently sodium hydroxide, is also a highly corrosive and injurious substance that requires special containment and careful disposal. Finally, glycerol, a relatively non-toxic byproduct of the transesterification reaction, requires storage and disposal.

The current invention is a response to these deficiencies. The primary objective of the invention is to provide a cleaner burning, more efficient, more cost-effective fuel for diesel engines and other applications. It is a hybrid fuel mixture of vegetable and animal oils extended in composition with relatively small amounts of petroleum diesel fuels. The vegetable and animal oils are preferably waste oils. To provide acceptable fuel characteristics, this hybrid fuel is further blended with a small amount of a composite mixture of chemical modifiers, referred to collectively as "stabilizer".

The completed mixture has excellent lubricity properties. The hybrid fuel is less expensive to produce than biodiesel and its production produces a minimum of environmentally unattractive by-products. Herein is described the composition and method of manufacture of the novel hybrid fuel and lubricant.

SUMMARY OF THE INVENTION

The object of the present invention is to provide a hybrid diesel fuel that is obtainable in major part from waste vegetable and animal sources and incorporating a minimum of petrochemical diesel feedstock.

Another object of the invention is to provide a fuel that can be utilized in standard diesel engines, without further modification of the engines. As such, the fuel should meet ASTM 6751 and ASTM 975, a set of standards that govern the qualities of biofuels for use in diesel engines.

Another object of the invention is to provide a fuel that is less polluting then commercial diesel fuels in engine or burner use.

Another object of the invention is to provide a mechanical lubricant for diesel engines derived substantially from waste biosynthetic oils of plant or animal origin.

Yet another object of the invention is to provide a more environmentally friendly and lower cost alternative to diesel and biodiesel fuels.

We have discovered that mixtures of commercial diesel fuels in the range of 10% to 50% and waste vegetable and animal oils of up to 90% mix well and burn efficiently in diesel engines. When tested, there is neither significant loss of engine power or engine torque, nor is there abnormal engine wear, compared to Diesel Number 2. Partly because of lower sulfur content, the hybrid fuel is less polluting than petroleum diesel fuels. Field testing shows that the hybrid mixture functions under extremes of weather conditions.

Diesel fuel functions as a lubricity agent for the working parts of a diesel engine that come in contact with the fuel. In addition to being a fuel, the invention also co-functions as an improved lubricant, when compared to Diesel Number 2. One benefit is that it reduces the knock or "gap time" in a diesel engine.

In 1993 United States Federal law was changed to require that the sulfur content in diesel fuel be less than 500 ppm (parts per million). An unintended consequence of this change was that treatments used to remove sulfur impurities also decreased lubricity. This difficulty is overcome with the invention. With the invention's ability to act as a lubricant, diesel engines run more quietly, maintain horsepower, and increase fuel economy because of less frictional loss.

For the complete invention, the pre-mixture resulting from the simple blending of the commercial diesel fuels and biosynthetic waste oils (pre-mixture) also needs to conditioned with additional components, collectively called the "stabilizer". In part, the stabilizer, added in small measure, allows the mixture of petroleum diesel fuel and biosynthetic oil to reach the same lubricity, pour, and flow rate as commercial diesel fuels. Additionally, the stabilizer maintains cetane requirement of the fuel, cleans oil solids from injector ports, lubricates diesel engine parts, demulsifies aqueous contamination, protects against fuel gelling, and reduces sulfur emissions (when compared to the petrochemical diesel component of the hybrid fuel).

To adjust for the availability of vegetable and animal waste oils, most recognized, commercial waste oils can be used in the hybrid mixture, singly or in any combination. The biosynthetic oils can be fresh, but preferably recycled. In all cases, the oils should be filtered and polished via the method of manufacture detailed below (see A. Method of Preparation of the Invention).

The petrochemical diesel component can be Diesel Number 1, Diesel Number 2, or Farm Diesel. These petroleum fuels can be used singly, or as desired, in any combination.

As utilized herein, the term "vegetable oil" refers to naturally occurring oils that are derived from botanical sources. The vegetable oil can be used directly after collection (straight vegetable oil, SVO) or after recycling as WVO. The term "animal oil" refers to oils and semisolid oils derived from animal fats and oils. The term "biosynthetic oil" refers to both vegetable and animal oils in any combination. The term "petroleum" refers to hydrocarbons obtained from mineral or geological sources. The term "fuel" in the present context is used to signify any fuel that may be used in a diesel engine or burner (such as heating a boiler or furnace).

As utilized herein, the term "diesel fuel" is understood to refer to those fuels that are utilized for powering compression ignition engines that do not employ spark ignition to initiate internal combustion, and additionally those engines that commonly use diesel fuel for a heat source.

In our context, the term "biodiesel" refers to diesel fuels synthesized from vegetable oil sources, by which the native glycerol fatty acid esters are replaced through transesterification with fatty acid esters of low-molecular weight alcohols. Examples of such low-molecular weight alcohols are methanol and ethanol.

The term "hybrid fuel" is utilized herein to indicate some mixture of petroleum, biosynthetic oils, or biodiesel fuels suitable for powering a diesel engine.

Petroleum diesel fuel is a distillate from crude oil obtained by collecting the fraction boiling at atmospheric pressure over an approximate temperature range of 250 to 350 degrees centigrade. In our context, the terms "Diesel Number 1" or "Diesel Number 2" refer, respectively, to the fuels obtained from the lower boiling components and higher boiling components of this fraction. Also in our context, the term "farm diesel" refers to lower quality, petroleum diesel fuel, containing higher concentrations of sulfur and used primarily for agriculture. Farm diesel is untaxed, and is also known as "red-diesel" because of the red dye used to distinguish this fuel from other diesel fuels.

Used herein, the term "stabilizer" or equivalently "stabilizer mixture" is a combination of components that further modifies or conditions the hybrid fuel to obtain better storage properties or combustion performance. Examples of these fuel properties are: lubricity, flow, pour, gelling temperature, emission quality, cetane value, homogeneity, detergent action, microbial growth. When specifically indicated, the term "stabilizer mixture" refers the composition detailed in Table 1, below.

The term "pre-mixture" refers to a blend of diesel fuel and biosynthetic fuel obtained during the manufacture of the invention, prior to addition of the stabilizer.

DETAILED DESCRIPTION OF THE INVENTION

The present invention is a hybrid fuel composition, which is composed of a minor amount of a petrochemical diesel fuel, a major amount of a biosynthetic oil, and a stabilizer. The amounts are expressed as a volume percentage. The petrochemical diesel fuel component is selected from the group consisting of Diesel Number 1, Diesel Number 2, and Farm Diesel fuels. A biosynthetic oil component is selected from the group consisting of peanut oil, vegetable shortening, cottonseed oil, soy oil, rapeseed oil, canola oil, palm oil, waste vegetable oil, tallow, lard, and yellow grease. The present invention also includes the obligatory method of manufacture.

The biosynthetic oils can be SVO or "virgin", that is, unused for any other purpose, but are preferably recycled waste oils; these individual species can be combined and utilized in any ratio. One skilled in the art will recognize that waste cooking oils may contain any of these individual oil components and others in any combination, as a result fat extraction from foodstuffs during frying.

The completed invention further contains a stabilizer mixture composed of additives to maintain cetane levels at or above petroleum diesel fuel requirements, additives to clean solids from the fuel system by detergent action, an additive to maintain lubrication of the diesel engine components designed to be lubricated by the diesel fuel, demulsifiers to separate water from the hybrid fuel, and anti-gelling agents. The completed invention functions, per se, as a biocide to control microbial growth.

Measured by volume, the hybrid fuel contains from about 10% to 50% of the petrochemical fuel component, preferably about 10% of the petrochemical fuel component. The hybrid fuel contains from about 90% to about 50% of the biosynthetic oil component, preferably about 90% of the biosynthetic oil component. The hybrid fuel contains from about 0.086% to about 0.17% of the stabilizer mixture by volume, preferably about 0.086% of the stabilizer mixture.

The essential components of the stabilizer mixture are shown in Table 1:

TABLE 1

| Function | Component | (v/v %) |
|---|---|---|
| cetane enhancer | 1-acetoxyethylene | about 6 to 8% |
| | Heavy Aromatic Solvent Naphtha | about 10 to 14% |
| | 5-pentenylsuccinimide | about 1 to 2% |
| | ethylbenzene | about 3 to 6% |
| | 2-ethyl hexylnitrate | about 29 to 31% |
| | 1,2,4-trimethylbenzene | about 2 to 4% |
| | 1-(methylethyl)benzene | about 0.1% |
| | Xylene | about 20 to 23% |
| demulsifier | 2-butoxyethanol | about 6 to 8% |
| | 2-ethylhexanol | about 0.1% |
| detergent | 1-hydroxy-3,6-dioxaoctane | about 0.4% |
| lubricant | Tall Oil Fatty Acid (TOFA) | about 1.0% |
| antigellant | Light Solvent Naptha | about 10 to 14% |

In Table 1, "Heavy Aromatic Solvent Naphtha" is that naptha fraction boiling over a range of 140° F. to 240° F. (60° C. to 116° C.). "Light Solvent Naptha" is that naptha fraction boiling over a range of 120° F. to 200° F. (49° C. to 93° C.). "Xylene" is any mixture of 1,2-, 1,3-, and 1,4-dimethylbenzenes. "Tall Oil Fatty Acid", a fatty acid mixture, is obtained from Tall Oil, a byproduct of wood pulp manufacture. Tall Oil Fatty Acid, with rosin content of 1-10%, is obtained by fractional distillation of Tall Oil.

One skilled in the art will recognize that small levels of unidentified chemical impurities will naturally be present in the materials listed in Table 1, and that the impurities will not significantly affect the function of the mixture.

Experimental Section

A. Method of Preparation of the Invention

Prefilter (on or off site), the virgin or waste biosynthetic oil through a 25 micron polyester filter at a temperature between about 105° F. and 125° F. (40.6° C. to 51.7° C.). Analyze the mixture for moisture, insolubles, and unsaponifiable material (MIU). The MIU content should be 1.5% or less. Filter again through an additional 25 micron filter at a temperature between about 105° F. and 120° F. (40.6° C. to 48.9° C.). Then, within the same temperature range of about 105° F. to 120° F., filter immediately through a 10 micron polyester filter. Further filter the mixture through a 5 micron polyester filter. Let the filtrate settle for about 3 hours in cone tanks. Remove the sediment from the bottom of the cone tanks. Add 10% to 50% (v/v) petroleum diesel and blend at about 110° F. (43.3° C.). Let sit without agitation for about 120 minutes.

Add stabilizer (0.086 to 0.17% v/v) to the mixture and blend at about 100° F. (37.8° C.) for 60 minutes. Transfer the mixture to cone tanks, storing at ambient temperature. Let the mixture settle for about 2 hours. Remove the sediment from the cone tanks. Filter the mixture through a 5 micron polyester filter into a holding tank. Transfer the mixture and spin for about 13 minutes at 2700 rpm, using a liquid separating model CINC centrifuge. Transfer the completed hybrid fuel to storage tanks.

B. Examples

For one favorable example of the useful invention (Composition A), 6 gallons (22.7 liter) of stabilizer mixture are added to a total of 7000 gallons (26,500 liter) of a fuel pre-mixture of 70% WVO and 30% Diesel Number 2 to give a final stabilizer concentration of 0.086%, v/v. A typical batch size is 7000 gallons. One experienced in the art will realize that the amount of stabilizer varies depending on the viscosity of the filtered oil; the thinner and cleaner the biosynthetic oil, the less stabilizer is needed. However, the minimum is 1 gallon per 1167 gallons (4,418 liter) of pre-mixture (0.086% v/v), regardless of the identity of the biosynthetic oil component.

For another example (Composition B), 12 gallons (45.4 liters, 0.17%, v/v) of stabilizer mixture are added to a total of 7000 gallons of a fuel pre-mixture of 70% beef tallow and 30% Diesel Number 2. Because the pre-mixture is more viscous than one formulated with WVO, an additional amount of the stabilizer is required.

The following additional examples illustrate, on a volume basis, other useful compositions of the invention suited for different fueling applications and environmental conditions. The following examples of compositions are based on a total pre-mixture volume of 7000 gallons (26,500 liters):

Composition C, for Winter, on or off road driving conditions: (25% WVO+25% beef tallow+45% Diesel Number 2+5% Diesel Number 1)+12 gallons of stabilizer mixture (0.17% v/v).

Composition D, for on or off road driving conditions: (55% Tallow+45% Diesel Number 2)+12 gallons of stabilizer mixture (0.17% v/v).

Composition E, for Summer, on or off road conditions: (55% WVO+45% Diesel #2)+12 gallons of stabilizer mixture (0.17% v/v)

Composition F, for on or off road driving conditions: (70% WVO+30% Diesel #2)+12 gals of stabilizer mixture (0.17% v/v).

C. Road Tests

Two identical Ford F-350 diesel trucks with identical motors, transmissions, drive lines, rear end gear ratios, age, and mileage were compared under both Summer (August, 2003) and Winter (February, 2003) field conditions. One truck was fueled with Diesel Number 2 and the other fueled with the invention (Composition A).

Both trucks were driven under normal, daily workloads over a 375 mile route. At the end of the August test, during which the ambient temperature was 90° F. (32.2° C.), the truck fueled with Composition A demonstrated an increase in fuel economy of 3.4% over the truck fueled with Diesel Number 2.

The trucks were similarly tested in February with an ambient temperature of 36° F. (2.2° C.). Again, the truck fueled with Composition A demonstrated an increase in fuel economy of roughly 3% over the truck fueled with Diesel Number 2

Both trucks were tested by the Oregon Department of Environmental and Air Quality Control (DEQ) for hydrocarbon and sulfur gas emissions. The truck powered with Composition A had a reduction in hydrocarbon emissions of 60% compared to the diesel-fueled truck. With respect to sulfur oxides, $SO_x$, the diesel-fueled truck emitted 615 parts per million of $SO_x$. In contrast, the truck fueled by the invention emitted less than 300 parts per million $SO_x$.

There was no loss of horsepower for the vehicle fueled with the invention. The truck fueled with Diesel Number 2 started with greater difficulty and emitted more exhaust during a cold start. The truck fueled with Composition A ran more quietly and had less knocking reaction at idle, indicating better lubricity and combustion characteristics.

The engine speed of the truck fueled by Composition A did not fluctuate noticeably when all the accessories were turned on (e.g., air conditioning, radio, lights, horn, etc.), in contrast to the diesel-fueled truck.

When both trucks pulled a trailer with a 2-ton (1800 kg) load, plus the trailer weight, up hills and across a rugged terrain, the truck fueled with Composition A pulled its trailer with less drag and accelerated more easily; these facts illustrated the improved lubricity and engine power provided by Composition A.

While the present invention has been related in terms of the foregoing examples, those skilled in the art will recognize that the invention is not limited to the examples depicted. The present invention can be practiced with modification and alteration within the spirit and scope of the appended claims. Thus, the description and examples are to be regarded as illustrative instead of restrictive on the present invention.

I claim:

1. A fuel composition for diesel engines comprising: at least one petrochemical fuel; at least one biosynthetic oil; and at least one stabilizer mixture, wherein the stabilizer mixture comprises by volume: 1-acetoxyethylene, about 6% to 8%; Heavy Aromatic Solvent Naphtha, about 10% to 14%; 5-pentenylsuccinimide, about 1% to 2%; ethylbenzene, about 3% to 6%; 2-ethyl hexylnitrate about 29% to 31%; 1,2,4-trimethylbenzene about 2% to 4%; 1-(methylethyl)benzene about 0.1%; Xylene about 20% to 23%; 2-butoxyethanol about 6% to 8%; 2-ethylhexanol about 0.1%; 1-hydroxy-3,6-dioxaoctane about 0.4%; Tall Oil Fatty Acid (TOFA) about 1.0%; and, Light Solvent Naptha, about 10% to 14%.

2. The fuel composition for diesel engines of claim 1 wherein the fuel composition meets quality standards ASTM 975 and ASTM 6751.

3. The fuel composition for diesel engines of claim 2 wherein the biosynthetic oil is selected from the group consisting of peanut oil, vegetable shortening, cottonseed oil, soy oil, rapeseed oil, canola oil, palm oil, waste vegetable oil, tallow, lard, and yellow grease.

4. The fuel composition for diesel engines of claim 2 wherein the petrochemical fuel is selected from the group consisting of Diesel Number 1, Diesel Number 2, and Farm Diesel.

5. The fuel composition for diesel engines as claimed in claim 2 wherein the petrochemical fuel is about 10% to 50% by volume of said fuel composition.

6. The fuel composition for diesel engines as claimed in claim 2 wherein the biosynthetic oil is up to 90% by volume of said fuel composition.

7. The fuel composition for diesel engines of claim 2 wherein the stabilizer mixture comprises about 0.086% to about 0.017% (v/v %) of the total volume of the petrochemical fuel and the biosynthetic oil pre-mixture.

8. The fuel composition for engines of claim 2 wherein the fuel composition further prevents the loss of horsepower and torque of the diesel engine compared to Diesel Number 2 fuel.

9. The fuel composition for engines of claim 2 wherein the fuel composition further prevents abnormal wear of engines compared to Diesel Number 2 fuel.

10. The fuel composition for engines of claim 2 wherein the fuel composition further reduces sulfur emissions of the diesel engines compared to Diesel Number 2 fuel.

11. The fuel composition for engines as claimed in claim 2 wherein the biosynthetic oil is at least one recycled vegetable oil.

12. The fuel composition for engines as claimed in claim 2 wherein the biosynthetic oil is at least one recycled animal oil.

13. The fuel composition for internal combustion engines as claimed in claim 2 wherein the fuel composition lubricates said engines and their related working parts equally or better than Diesel Number 2 fuel.

14. The fuel composition of claim 2 comprising: about 10% to 50% volume of at least one petroleum fuel; about 90 to 50% volume of at least one biosynthetic oil; and, about 0.086% to 0.017% by volume of a stabilizer mixture configured to enable the fuel composition to reach the same lubricity, pour rate, and flow rate as Diesel Number 2 fuel.

15. The fuel composition for diesel engines of claim 14 wherein the biosynthetic oil is selected from the group consisting of peanut oil, vegetable shortening, cottonseed oil, soy oil, rapeseed oil, canola oil, palm oil, waste vegetable oil, tallow, lard, and yellow grease.

16. The fuel composition for engines as claimed in claim 14 wherein the petrochemical fuel is selected from the group consisting of Diesel Number 1, Diesel Number 2 and Farm Diesel.

17. The fuel composition for engines as claimed in claim 14 wherein the stabilizer mixture components are selected from the group consisting of: at least one additive configured to maintain cetane levels at or above petroleum fuel requirements for Diesel Number 2 fuel; at least one additive configured to maintain and clean oil solids from injectors and fuel systems; at least one additive configured to maintain lubrication of said internal combustion engines and their parts; at least one additive configured to remove or separate water from said at least one fuel and said fuel composition; and, at least one additive configured to prevent gelling of said fuel composition.

18. The stabilizer mixture as claimed in claim 14 wherein the stabilizer mixture comprises by volume: 1-acetoxyethylene, about 6% to 8%; Heavy Aromatic Solvent Naphtha, about 10% to 14%; 5-pentenylsuccinimide, about 1% to 2%; ethylbenzene, about 3% to 6%; 2-ethyl hexylnitrate about 29% to 31%; 1,2,4-trimethylbenzene about 2% to 4%; 1-(methylethyl)benzene about 0.1%; Xylene about 20% to 23%; 2-butoxyethanol about 6% to 8%; 2-ethylhexanol about 0.1%; 1-hydroxy-3,6-dioxaoctane about 0.4%; Tall Oil Fatty Acid (TOFA) about 1.0%; and, Light Solvent Naptha, about 10% to 14%.

* * * * *

UNITED STATES PATENT AND TRADEMARK OFFICE
CERTIFICATE OF CORRECTION

PATENT NO. : 7,648,539 B2
APPLICATION NO. : 11/602621
DATED : January 19, 2010
INVENTOR(S) : Timothy Dion Wetzel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 403 days.

Signed and Sealed this

Twenty-third Day of November, 2010

David J. Kappos
*Director of the United States Patent and Trademark Office*